United States Patent [19]
Kass

[11] 3,820,636
[45] June 28, 1974

[54] SELF-ADJUSTING CONTROL LINKAGE FOR AN EXTERNAL BAND BRAKE

[75] Inventor: John Joseph Kass, Dubuque, Iowa

[73] Assignee: Deere & Company, Moline, Ill.

[22] Filed: Aug. 16, 1973

[21] Appl. No.: 388,735

[52] U.S. Cl. .......................... 188/77 R, 188/196 BA
[51] Int. Cl. ............................................. F16d 65/56
[58] Field of Search............ 74/512, 516; 188/77 R, 188/79.5 GE, 79.5 R, 196 BA

[56] References Cited
UNITED STATES PATENTS

| | | | |
|---|---|---|---|
| 2,854,858 | 10/1958 | Butterfield et al. ............ | 188/77 R X |
| 3,103,991 | 9/1963 | Flinn ........................ | 188/196 BA X |
| 3,199,640 | 8/1965 | Thompson..................... | 188/196 BA |
| 3,473,632 | 10/1969 | Kimura et al. ................ | 188/77 R |

*Primary Examiner*—Duane A. Reger

[57] ABSTRACT

An external band brake control linkage includes a pair of anchor pins which are respectively connected to the opposite ends of a brake band, the linkage being operable between a normal released condition holding the anchor pins spaced apart so as to maintain the band disengaged from the brake drum and an operative condition wherein the anchor pins are moved together from the position they occupy when the linkage is in its released condition wherein the brake band is engaged with the brake drum. For the purpose of compensating for brake band wear, the control linkage includes a link having a ratchet wheel-type adjusting nut threaded on a rod-like end thereof, the adjusting nut being advanceable so as to change the spacing between the anchor pins. In a first embodiment, a pawl or an adjusting nut operating lever is carried by a link of the control linkage and is operative in response to the link undergoing a predetermined movement, corresponding to brake band wear, to index the adjusting nut so as to compensate for the wear. In a second embodiment, a pawl or an adjusting nut operating lever is mounted on the brake housing and is positioned so as to index the adjusting nut when the latter has moved with the control linkage a predetermined distance corresponding to brake band wear to compensate for the wear.

6 Claims, 4 Drawing Figures

3,820,636

SELF-ADJUSTING CONTROL LINKAGE FOR AN EXTERNAL BAND BRAKE

BACKGROUND OF THE INVENTION

The present invention relates to a self-adjusting linkage for controlling a brake and more particularly relates to such a linkage for controlling a brake of the external band type.

Control linkages for external band brakes are known which are of a type including a pair of anchor pins respectively connected to the opposite ends of the brake band and operative for anchoring one end on the brake band to the brake housing, when the brake drum is rotating in a first direction, while simultaneously moving the other end of the brake band toward the one end, and for anchoring the other end of the brake band to the housing, when the brake drum is rotating in the opposite direction, while simultaneously moving the one end of the brake band toward the other end. These linkages are constructed so as to dispose the brake band such that a desired gap exists between the band and the brake drum when they are in a released condition, and such that the band is moved a predetermined distance to cause its engagement with the brake drum when the actuating linkage is in an actuated condition. As the brake band wears, the desired gap between the band and the drum is no longer maintained and the linkage must be overtravelled to apply the brake band against the brake drum. While a certain amount of overtravel can be designed into the linkage, it is usually more desirable, because of space limitations and the like, to maintain the amount of linkage travel within a predetermined range.

To minimize the effects of brake band wear on the operation of the control linkage, it is known to provide brake control linkage with automatic adjusting means which are responsive to a predetermined amount of movement of the control linkage beyond that necessary to cause full engagement of an unworn brake band to change the released-condition distance between the brake band ends so as to compensate for the wear of the brake bands.

Heretofore, these self-adjusting means have not been entirely satisfactory, due to their being complex and somewhat unreliable in operation.

SUMMARY OF THE INVENTION

It is therefore an object of the present invention to provide a self-adjusting linkage for use in controlling the application of a brake band of the external type, the self-adjusting linkage being simple and reliable in construction.

Another object of the present invention is to provide such a self-adjusting linkage which will operate to constantly maintain the amount of linkage movement necessary to cause brake application within a predetermined range thereby eliminating the need for undue overtravel of the linkage beyond that movement necessary for causing full engagement of an unworn brake band.

According to the present invention, there is provided a control linkage which interconnects the opposite ends of a brake band and is operative to hold the opposite brake band ends in fixed, spaced relationship to each other when the linkage is in a normal released condition and including a link, the effective length of which is automatically adjustable for effecting changes in the spaced relationship between the brake band ends in response to a predetermined movement of the linkage which reflects brake band wear, the adjustment compensating for the wear. More specifically, according to the present invention there is provided a link having a ratchet wheel-type nut threaded on one end thereof and movable for adjusting the effective length of the link, the nut having a circular disc portion having teeth about the periphery thereof and a pawl or an adjusting lever being biased into contact with the disc portion and being operative to index the adjusting nut when the control linkage has undergone a predetermined movement from its released condition and to cause movement of the adjusting nut when the control linkage has returned to its released condition. In one embodiment of such a control linkage, the adjusting nut operating lever is mounted so as to move into operative engagement with a tooth of the adjusting nut and in a second embodiment the adjusting nut is mounted so as to move a tooth thereof into engagement with the adjusting nut operating lever.

DESCRIPTION OF THE PREFERRED EMBODIMENTS

Figure 1:
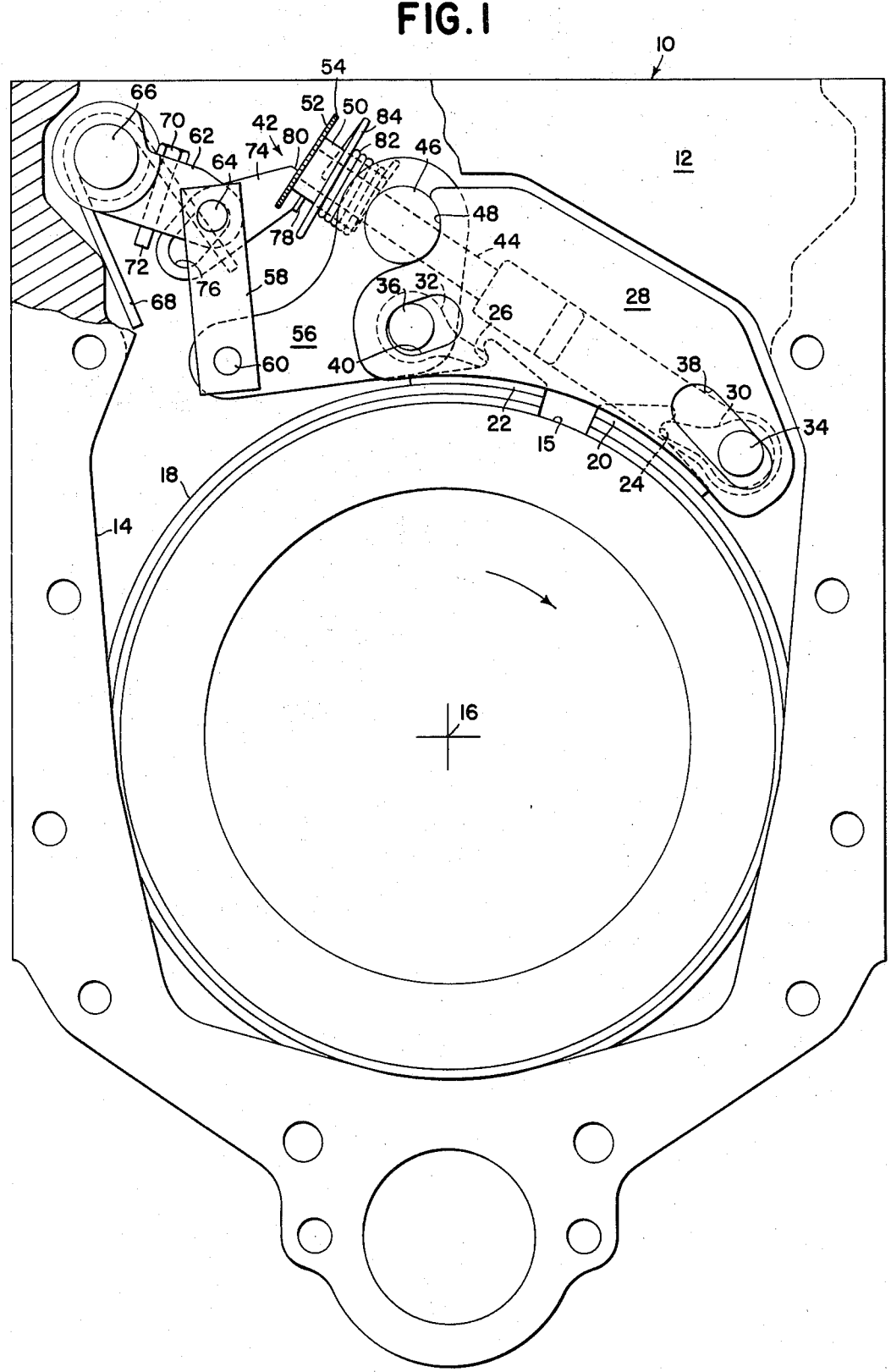
FIG. 1 is a side elevational view of the control linkage of the present invention mounted in the brake housing, the housing being only partially shown and having parts shown in section and broken away so as to reveal the control linkage.
Figure 2:
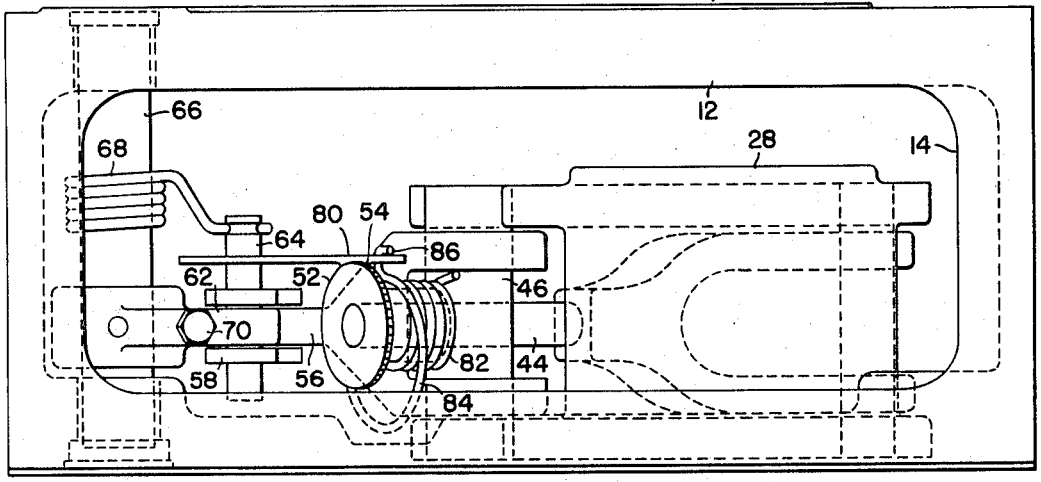
FIG. 2 is a top plan view of the control linkage shown in FIG. 1.

Referring now to FIGS. 1 and 2, therein is shown a brake assembly indicated in its entirety by the numeral 10. The brake assembly 10 includes a housing 12 defining a cavity 14 in which is located a cylindrical brake drum 15 which is mounted in the housing for forward and reverse rotation about a transverse axis located at 16, the forward direction of rotation being clockwise, as viewed in FIG. 1. Encircling a substantial portion of the brake drum 14 is a brake band 18 having opposite spaced-apart ends comprising first and second brake band end members 20 and 22 respectively defining oppositely opening seats 24 and 26. The brake band 18 is illustrated somewhat schematically and is shown in a released condition wherein it is spaced from the brake drum 14. The end members 20 and 22 extend between the opposite sides of an inverted channel-like mounting member 28 which is rigidly secured to the housing 12 and thus in effect forms a portion thereof. Also extending between the opposite sides of the mounting member 28 are first and second generally wedge-shaped struts 30 and 32, respectively, having rounded ends which are disposed in the seats 24 and 26 of the brake band end members. The first and second struts 30 and 32 are swively mounted on first and second anchor pins 34 and 36, respectively, the anchor pin 34 having its opposite ends received in transversely aligned slot-like openings 38 formed in the opposite sides of the mounting member 28 and the second anchor pin 36 having its opposite ends received in a pair of transversely aligned slot-like openings 40 respectively formed in the opposite sides of the mounting member 28. The pairs of openings 38 and 40 are elongated along respective paths which converge at a location spaced radially outwardly from and generally between the brake band end members 20 and 22.

A control linkage, indicated generally at 42, is provided for controlling the movement of the anchor pins 34 and 36 and, hence, the movement of the opposite ends of the brake band 18 so as to effect engagement and disengagement of the brake band with the brake drum. The control linkage 42 comprises a link train including a motion-transfer link 44 positioned between the opposite sidewalls of the mounting member 28 and having a yoke-like right-hand end pivotally connected to the first anchor pin 34 and having a rod-like left-hand end slidably received in a crossbore located in a third anchor pin 46. The third anchor pin 46 extends parallel to the transverse axis 16 and is illustrated in a position wherein it is seated against transversely aligned complementary bearing surfaces 48 formed in the left-hand end of the sides of the mounting member 28, the bearing surfaces 48 being radially outward from the pair of slot-like openings 40. The left-hand end of the motion-transfer link 44 is threaded and has a pawl or an adjusting nut 50 threaded thereon, the outer end of the adjusting nut 50 being in the form of a circular disc 52 and having a plurality of equally spaced teeth 54 located around the periphery thereof. A bellcrank-like actuating lever 56 has a yoke-like right-hand portion located partially between the opposite sidewalls of the mounting member 28 and having the second and third anchor pins 36 and 46, respectively, pivotally received therein, the actuating lever 56 thus being floatingly connected to the mounting member 28 for a purpose described hereinafter. A connecting link 58 has a bifurcated lower end positioned in straddling relationship to the left-hand end of the actuating link 56 and is pivotally connected thereto by a pin 60. The upper end of the connecting link 58 is likewise bifurcated and straddles the free end of a crank arm 62, the link 58 and crank arm 62 being pivotally interconnected, as at a pin 64. The crank arm 62 is rigidly fixed for movement with an input shaft 66 which is journaled in the housing 12 for rotation about an axis which extends parallel to the axis 16. A torsion return spring 68 is coiled about the input shaft 66 and has opposite ends bearing upon the housing and the pin 64, the return spring 68 acting to resist clockwise movement of the input shaft 66 from a released position, that position illustrated in the drawings, towards a fully engaged position which is limited by a set screw 70 carried in the crank arm 62 and having an exposed end 72 positioned for contacting the housing 12 after undergoing a predetermined range of movement.

Automatic adjustment of the link train to compensate for brake wear is accomplished through means including an adjusting nut operating lever 74 having a transverse elongate opening 76 in which is received the pin 64. The opening 76 is arranged so as to be elongated in the direction of the path of movement of the pin 64 as it moves with the crank arm 62. The lever 74 has a transverse projection 78, which underlies and is normally in engagement with the adjusting nut 50, and has a right-hand end portion 80 which is shaped for engaging at least one of the teeth 54 of the adjusting nut and is biased into engagement with a side of the disc-like end 52 by means of a torsion spring 82 which is coiled about the adjusting nut and has a right-hand terminal end in engagement with the bellcrank-like actuating lever 56 and has a left-hand enlarged coil 84 which terminates in a hooked end 86 which is received in a transverse aperture extending through the portion 80 of the actuating lever. The torsion spring 82 thus acts to bias the actuating lever 74 in a clockwise direction about the pin 64 with the enlarged coil 84 being disposed so as to urge the portion 80 of the actuating lever transversely into engagement with the adjusting nut.

The operation of the control linkage embodiment thus far described is as follows. Assuming that the brake assembly shown is the right-hand brake assembly of a vehicle, forward travel of the vehicle will result in closkwise rotation of the brake drum 14 and reverse travel of the vehicle will result in counterclockwise rotation of the brake drum. Both clockwise and counterclockwise rotation of the brake drum can be stopped by actuating the control linkage to place it in a brake-engaging condition (not shown). Specifically, the brake-engaging condition is accomplished by causing the input shaft 56 to be rotated in the clockwise direction. This rotation may be effected manually by means of a foot- or hand-operable linkage (not shown). In any event, clockwise rotation of the input shaft 56 will cause downward swinging movement of crank arm 62 which in turn causes downward movement of the connecting link 58. This downward movement of the link 58 initially causes the actuating lever 56 to be swung counterclockwise about the axis of the third anchor pin 46, which is now seated against the bearing surfaces 48. As the actuating lever 56 pivots, the second anchor pin 36 is moved such as to cause the second strut 32 to force the brake band end member 22 towards the right which brings the brake band 18 into contact with the brake drum 14. If the brake drum is rotating in the clockwise direction, the friction force acting on the brake band will tend to rotate the brake band clockwise and a rightward force will thus be imposed on the first anchor pin 34 through means of the brake band end member 20 and the strut 30. This rightward force will also act through the motion-transfer link 44 to urge the adjusting nut 50 into engagement with the third anchor pin 46 to firmly seat the latter against the bearing surfaces 48. When this condition is present, the brake band end member 20 will be anchored in place and further rotation of the actuating lever 56 will move the brake band end member 22 towards the member 20 to thus cause the brake band 18 to become fully engaged with the brake drum. As the input shaft 66 is being rotated to fully engage the brake band with the brake drum, the pin 64 moves downwardly in the slot-like opening 76 of the adjusting nut actuator lever 74. Normally, the brake band 18 will become fully engaged with the brake drum 14 before the pin reaches the lower end of the opening 76 and before the set screw end 72 comes in contact with the housing 12. However, as the brake band wears, the pin 64 gradually approaches and finally contacts the bottom end of the slot-like opening 76. As the brake band wears still further, the pin 64 will act on the adjusting nut actuating lever 74 to pull the latter downwardly therewith against the bias of the spring 82 and after a predetermined movement, the portion 80 of the lever 74 will move into a position between adjacent ones of the teeth 54 of the adjusting nut. Then when the operator ceases actuation of the input shaft 56, the torsion spring 68 will return the input shaft 56 to its disengaged position and the spring 82 will cause a turning movement to be imparted to the adjusting nut 50 so as to index the latter a predetermined increment onto the motion-transfer link 44. This movement of the adjusting nut 50 causes the motion-transfer link 44 to be shifted leftwardly to thus shift the first anchor pin 34 leftwardly relative to the second and third anchor pins 36 and 46, respectively. This change in position of the first anchor pin 34 is such that it will compensate for the wear which enabled the adjusting nut actuator lever 74 to be moved downwardly far enough to engage a tooth of the adjusting nut.

It is here noted that the set screw 70 is positioned so as to permit the crank arm 62 to swing clockwise only slightly further than the movement needed to effect indexing of the adjusting nut by the adjusting nut actuator lever 74.

If the brake drum is rotating in the reverse direction when the operator effects actuation of the brake control input shaft 56 so as to bring the brake band 18 into contact with the brake drum 14, the operation is only slightly different than that just described. With the brake drum 14 rotating in reverse, the friction force acts on the brake band 18 and tends to rotate it counterclockwise and this action causes the second anchor pin 36 to become seated in the left end of the pair of slot-like openings 40. At this point, the actuator lever 56 begins to rotate about the second anchor pin 36 at its center, the movement of the actuator lever 56 thus being transmitted to the first anchor pin 34 by means of the motion-transfer link 44. The remaining operation of the control linkage 42 is the same as that described above relative to its being actuated during forward rotation of the brake drum 14.

Figure 4:
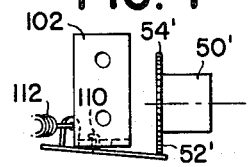
FIG. 4 is a top plan view of the adjusting nut actuating lever shown in FIG. 3.
Figure 3:
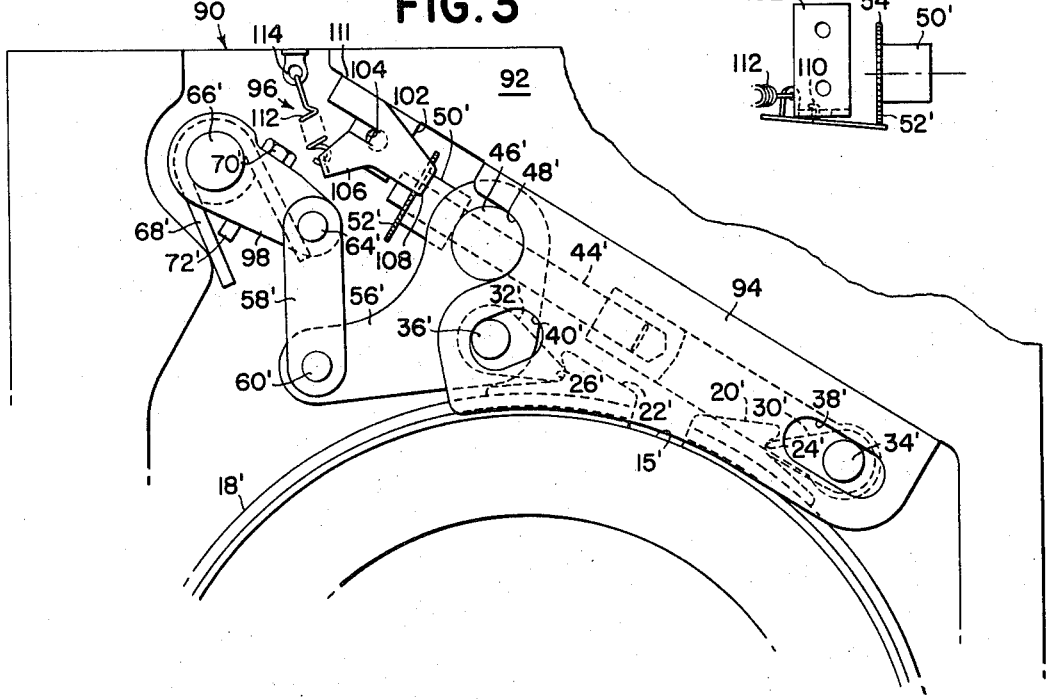
FIG. 3 is a side elevational view showing a second embodiment of the control linkage of the present invention.

Referring now to FIGS. 3 and 4, therein is shown a brake assembly 90 which comprises a second embodiment of the invention. The brake assembly 90 includes parts which are similar to those described above and the similar parts are given like but primed reference numerals. Thus the brake assembly 90 includes a housing 92 which defines the cavity in which a brake drum 15' is mounted for forward and reverse rotation about a transverse axis 16'. A brake band 18' substantially encircles the brake drum 15' and includes spaced-apart right and left ends to which brake band end members 20' and 22' are respectively fixed, the members respectively defining opposite facing seats 24' and 26'. An inverted, channel-like mounting member 94 is fixed to the housing 92 and includes opposite transversely spaced sidewalls positioned such that the brake band end members 20' and 22' extend therebetween. The brake band 18' is connected to the mounting member 94 through means including first and second generally wedge-shaped struts 30' and 32' respectively having end portions seated in the seats 24' and 26' and being respectively swively mounted on first and second anchor pins 34' and 36', the anchor pins in turn having their opposite ends respectively received in first and second pairs of transversely aligned slot-like openings 38' and 40' located in the opposite sidewalls of the mounting member 94. The openings 38' and 40' are elongated along respective paths which intersect at a location generally radially outwardly of and between the brake band end members 20' and 22'.

For the purpose of controlling the movement of the first and second anchor pins 34' and 36', respectively, along their respective pairs of slots 34' and 40', there is provided a control linkage or linkage train 96. The control linkage 96 includes a motion-transfer link 44' which is located between the opposite sidewalls of the mounting member 94 and includes a yoke-like right-hand end which is pivotally connected to the first anchor pin 34', and a rod-like left-hand end which is slidably received in a crossbore formed in a third anchor pin 46', the third anchor pin having its opposite ends, when the control linkage is in a released condition as illustrated, respectively bearingly engaged with a pair of complementary-shaped bearing surfaces 48' formed in the left end of the mounting member 94. The left end of the motion-transfer link 44' is threaded and has an adjusting nut 50' threaded thereupon, the adjusting nut including a circular disc-like end 52' including a plurality of equispaced teeth 54' formed about the periphery thereof. A bellcrank-like actuating lever 56' includes a rightward yoke portion which is located partially between the opposite sidewalls of the channel-like mounting member 94 and has the second and third anchor pins 36' and 46' respectively mounted therein. A connecting link 58' has bifurcated upper and lower ends, the lower end having transversely spaced parts located on opposite sides of and pivotally connected, as at pin 60', to the left end of the actuating lever 56' and the upper end including transversely spaced parts having the end of a crank arm 98 located therebetween and pivotally connected thereto through means of a pin 64'. The crank arm 98 is fixed for movement with an input shaft 66' which is rotatably mounted in the housing 92 for rotation about a transverse axis which extends parallel to the axis 16'. For the purpose of returning the input shaft 66' to its released, nonactuated position, the position shown, from an actuated position, there is provided a coil torsion spring 68' having its coils mounted on the input shaft 66' and having its opposite ends respectively bearing on the housing 92 and the pin 64'. The crank arm 98 carries a set screw 70' having an end 72' disposed for engaging the housing 92 after the input shaft has undergone a predetermined amount of rotation from its released position to an actuated position.

Fixed to the housing 92 adjacent the adjusting nut 50' is a bracket 102 having a depending leg in which is located a transverse aperture 104. A substantially flat adjusting nut operating lever 106 has a right-hand end portion 108 which is in engagement with one side of the disc-like end 52' of the adjusting nut 50' and has an upper left-hand end portion which is in engagement with the housing 92. The actuator lever 106 further includes a transversely extending hook-like portion or tab 110 which extends through the aperture 104 of the bracket 102 and a coil tension spring 112 is connected between a transversely extending part 114 at the lower left portion of the actuator lever and housing 92 so as to normally maintain the lever 106 in the position illustrated in FIG. 3 wherein an upper edge 112 engages the housing 92. It is here noted that the tab 110 is dimensioned so as to permit the lever 106 to rotate in the aperture 104.

The operation of the embodiment of the invention disclosed in FIGS. 3 and 4 is as follows. Assuming that the control linkage 96 is in the released condition illustrated and that the brake drum 15' is rotating in the forward direction or clockwise about the axis 16', the rotation of the brake drum 15' can be braked by manually actuating the input shaft 66', as through a foot-operated linkage, for example, to cause the shaft to rotate clockwise against the bias of the return spring 68'. As the input shaft 66' rotates, the crank arm 98 will move therewith and shift the connecting link 58' downwardly resulting in downward movement of the left end of the actuator lever 56'. Initial movement of the actuator lever 56' will be in the nature of counterclockwise rotation about the axis of the third anchor pin 46'. This pivotal movement will cause the second anchor pin 36' to be shifted downwardly and rightwardly in the pair of slot-like openings 40' so as to cause the second strut 32' to press against the brake band end member 22' and move the brake band 18' into contact with the brake drum 14'. Upon making initial contact with the brake drum 14', the friction force will act on the brake band and tend to cause the latter to rotate with the brake drum thus causing a rightward acting force to be imposed on the first anchor pin 34'. This rightward force acts through the first anchor pin and the motion-transfer link 44' to firmly seat the third anchor pin 46' in the bearing surfaces 48' and further rotation of the lever 56' will be about the axis of the seated pin 46'. Since the actuator lever 56' is rotating about the axis of the pin 46', the relative positions of the adjusting nut actuating lever 106 and the adjusting nut 50' will remain the same throughout the movement of the control linkage between its released and fully engaged positions. Thus, it is apparent that no automatic adjustment of the adjusting nut 50' will take place when the brake drum is braked as it rotates in the forward direction.

On the other hand, assuming that the brake drum 14' is rotating in the reverse direction about the axis 16' when the input shaft 66' is manually actuated to effect braking operation, the crank arm 98 will again act through the connecting link 58' to cause the actuating lever 56' to undergo initial counterclockwise rotation about the axis of the third anchor pin 46' so as to effect initial engagement of the brake band 18' with the brake drum 14'. The friction force resulting from this initial engagement will act through the brake band so as to cause it to tend to rotate counterclockwise with the brake drum, the second brake band end member 22' then acting through the second strut 32' to cause the second anchor pin 36' to become seated in the left end of the pair of slot-like openings 40'. Further movement of the actuator lever 56' then will be about the axis of the second anchor pin 36' which movement will result in the adjusting nut 50' being moved downwardly relative to the adjusting nut operating lever 106. The movement of the adjusting nut 50' will not be enough to bring a tooth into register with the bottom surface of the portion 108 of the actuating lever 106 unless the brake band 18' has undergone a predetermined amount of wear since full engagement of the brake band will be accomplished before the necessary movement has occurred. Once the band has worn a predetermined amount, the control linkage, and hence the adjusting nut 50' will move relative to the actuator lever 106 a sufficient amount so as to effect register of the actuating lever with one of the teeth 54' of the adjusting nut. Upon releasing the input force manually applied to the input shaft 66', the torsion return spring 68' will return the input shaft 66' to its released condition illustrated. This return of the input shaft to its released condition will initially cause the actuating lever 56' to be pivoted clockwise about the second anchor pin 36'. As long as the brake band 18' is engaged with the brake drum 15', the forces in the motion-transfer link 44' will keep the adjusting nut 50' in such frictional engagement with the third anchor pin 46' that upward movement of the adjusting nut 50' will not result in the adjusting nut being advanced, but rather will result in the adjusting nut actuating lever 106 being rocked counterclockwise against the tension of the coil spring 112. Once the brake band 18' has become disengaged from the brake drum 15' the adjusting nut will no longer be forced into engagement with the third anchor pin and the coil tension spring 110 will then act to move the adjusting nut actuating lever 106 back to its original position, which movement will result in the adjusting nut being advanced so as to change the effective length of the motion-transfer link 44'. This change in effective length results in the first anchor pin 34' being moved leftwardly in the pair of slot-like openings 38' sufficiently to compensate for the wear of the brake band 18'.

I claim:

1. In a brake construction of the type including a brake band substantially encircling a brake drum mounted on a support for rotation about a fixed axis, the brake band having first and second spaced ends connected to a control linkage selectively operable between a normal released condition, towards which the linkage is biased and wherein the brake band ends are positioned such that the band is spaced from said drum, and a brake-applying condition, wherein the brake band ends are positioned closer together than when in their released positions and the band is in engagement with said drum, the improvement wherein said control linkage comprises: first and second anchor pins respectively connected to the first and second ends of the brake band and extending parallel to said axis; said support including means guidingly retaining said first and second anchor pins for limited movement towards and away from each other; a lever having said second anchor pin mounted therein; a third anchor pin mounted in said lever; said support including surface means defining a seat shaped complementary to and disposed so as to receive said third anchor pin when the linkage is in said released condition; a motion-transmitting link connected between said first and third anchor pins and including rotatable ratchet wheel means operable for adjusting the released position of said first anchor pin so as to compensate for brake band wear; a pawl means being mounted on one of said support and linkage and being in engagement with said ratchet wheel means and being operable in response to a predetermined movement of said linkage towards its brake-applying condition becoming positioned relative to said ratchet wheel means for indexing said ratchet wheel means upon the linkage returning to said released condition.

2. The brake construction defined in claim 1 wherein said motion-transmitting link includes a rod-like end portion; said third anchor pin being provided with a crossbore receiving said rod-like end portion; and said ratchet wheel means being in the form of a nut threadedly received on said rod-like end portion.

3. The brake construction defined in claim 1 wherein said pawl means includes a lever having an elongate opening therein; pin means passing through said elongate opening and connecting said lever to said linkage; biasing means connected between said lever and said linkage and holding said lever in a normal position wherein it is in nonactuating engagement with said ratchet wheel means; said elongate opening, pin means and biasing means being so positioned relative to each other that said linkage acts to move said lever against the force of the biasing means into actuating engagement with said ratchet wheel means only when said linkage undergoes said predetermined movement and said last-mentioned biasing means then acting to return said lever to its normal position when the linkage moves back to its released condition and thereby causing said lever to effect rotation of said ratchet wheel means.

4. The brake construction defined in claim 3 wherein said support includes a bracket located adjacent said ratchet wheel means; said pawl means including a lever pivotally mounted on said bracket and having an end in engagement with said ratchet wheel means; biasing means connected between said support and lever and biasing the latter against said ratchet wheel means and in a first direction about its pivotal connection with said bracket towards a normal position; said lever being so positioned relative to the ratchet wheel means that when said linkage undergoes said predetermined movement said ratchet wheel means moves therewith to a different location so disposed relative to said lever that during the return of said linkage to its released condition said lever is pivoted opposite said first direction against the force of said biasing means, the latter acting to move said lever to its normal position once the linkage is in its released condition and to thereby index said ratchet wheel means.

5. A self-adjusting brake operating linkage in combination with an external band-type brake, comprising: a brake housing; a cylindrical brake drum located in said housing and mounted for forward and reverse rotation about a transverse axis; a brake band encircling a considerable portion of said drum and having first and second spaced-apart terminal end portions; first and second guide slot means being formed in said housing respectively in the vicinity of said first and second terminal end portions of said brake band and defining respective paths of travel converging towards a point, which relative to said transverse axis, is spaced radially outward from and between said first and second guide slot means; first and second pins extending parallel to said transverse axis and being respectively slidably received in said first and second guide slot means; first and second connection means respectively interconnecting said first and second pins to said first and second terminal end portions of said brake band for moving said terminal end portions together when said first and second pins are moved together along said guide slot means to cause braking engagement of said brake band with said brake drum; a third pin extending parallel to said transverse axis and being located, relative to said axis, at a position radially outward of and in substantial radial alignment with said first pin; cylindrical bearing surface means being formed in said housing for selectively receiving said third pin in complementary bearing relationship; a bore extending crosswise through said third pin; a motion-transfer member having a rod-like end portion extending through said bore and terminating in a first threaded end at the opposite side of said third pin from said first pin and said motion-transfer member having a second end connected to said first pin; an adjusting nut being threaded on said first threaded end of said motion-transfer member and including a circular disc-like end having a plurality of relatively small teeth formed in the periphery thereof, the adjusting nut thus being operative to adjust the distance between said second and third pins; a brake control input shaft extending parallel to said transverse axis and being rotatably mounted in said housing and located such that said first and third pins are located between said shaft and said second pin; a crank arm being fixed to said shaft for rotation therewith; a fourth pin extending parallel to said transverse axis and being mounted in said crank arm; a first link; said first and third pins being fixed to said first link for movement therewith; a second link having opposite ends respectively pivotally connected to said fourth pin and to said first link; said first, second, third and fourth pins, said first and second links and said motion-transfer member being positioned relative to each other such that said first pin will seat in one end of said first guide slot means and said first link will rotate about the axis of the first pin when said brake control input shaft is actuated while the brake drum is rotating in a reverse direction and such that said third pin will seat in said cylindrical bearing surface means and said first link will rotate about the axis of said third pin when said brake control input shaft is actuated while the brake drum is rotating in a forward direction; and adjusting nut actuating means being mounted on one of said housing and crank arm and being biased into engagement with said adjusting nut and including a portion in engagement with at least one tooth of said adjusting nut, said adjusting nut actuating means being responsive to a predetermined movement of linkage, corresponding to brake wear, including said crank arm and first and second links for advancing said adjusting nut onto said motion-transfer member so as to adjust the distance between said second and third pins.

6. A self-adjusting brake operating linkage in combination with an external band-type brake comprising: a brake housing; a brake drum mounted in said housing for forward and reverse rotation about a transverse axis; a brake band encircling a substantial portion of said brake drum and having spaced-apart first and second ends; first, second and third anchor pins extending parallel to said transverse axis with said first and second anchor pins respectively being connected to said first and second brake band ends; a lever having said second and third anchor pins mounted therein; a motion-transfer link means interconnecting said first and third anchor pins; mounting means being integral with said housing and including guide surface means captively holding said first and second anchor pins and providing first and second complementary seating surfaces respectively for said second and third anchor pins; brake control input link means being connected to said lever and selectively operable for moving said lever between a normal brake releasing condition, wherein said third anchor pin is seated in said second complementary seating surface, and a brake-engaging condition; said brake control input link means including return bias means acting to retain said lever in said releasing condition; said lever, motion-transfer link, guide surface means and anchor pins being so arranged relative to each other that initial movement of said lever towards said engaging condition will be primarily about the axis of the seated third anchor pin and will cause initial engagement of the brake band with the brake drum resulting, in the case of forward rotation of the brake drum, in a functional force acting through said second brake band end, second anchor pin and motion-transfer link to keep said third anchor pin seated to define a first pivot axis for said lever and resulting, in the case of reverse rotation of the drum, in a frictional force acting through said first brake band end to move said first anchor pin against said first complementary seating surface to define a second pivot axis for the lever; said motion-transfer link means including adjustable means for changing the distance between said first and third anchor pins to compensate for brake band wear; said brake control input linkage and said lever being arranged to undergo a normal range of movement to effect full engagement of an unworn brake band with the brake drum and to undergo movement increasingly more than the normal range of movement to effect full engagement of an increasingly wearing brake band; and operating means being responsive to a predetermined movement of said input linkage and lever beyond said normal range of movement for adjusting said adjustable means for changing the distance between said first and third anchor pins.

* * * * *